United States Patent

[11] 3,616,296

| [72] | Inventors | Gunther Bernhardt<br>Hangelar;<br>Robert Buning, Troisdorf-Sieglar, both of Germany |
|---|---|---|
| [21] | Appl. No. | 889,707 |
| [22] | Filed | Dec. 31, 1969 |
| [45] | Patented | Oct. 26, 1971 |
| [73] | Assignee | Dynamit Nobel AG<br>Postfach, Germany |
| [32] | Priority | Feb. 2, 1969 |
| [33] | | Germany |
| [31] | | P 19 05 097.6 |

[54] METHOD FOR METALLIZING PLASTICS
9 Claims, No Drawings

[52] U.S. Cl. ................................................. 204/30,
106/1, 117/35 S, 117/47 A, 117/160 R
[51] Int. Cl. ........................................ B44d 1/092,
C23c 3/02
[50] Field of Search ........................................ 117/47 A,
160, 35 S; 106/1; 204/30

[56] References Cited
UNITED STATES PATENTS
3,134,690  5/1964  Eriksson ........................ 117/47 A
OTHER REFERENCES
Owen, J. T. Chemical Deposition of Silver On Nonconductive Bodies, in Plating, Vol. 38, 1951, p. 353. TS670A3

*Primary Examiner*—Alfred L. Leavitt
*Assistant Examiner*—Janyce A. Bell
*Attorney*—Burgess, Dinklage & Sprung

ABSTRACT: Improved process for metallizing various plastic materials, including shaped vinyl chloride polymer and acrylonitrile-butadiene-styrene polymer articles, which includes using as the sensitizing solution in the known metallization process a solution which contains at least one tin IV salt dissolved therein in addition to the tin II and other conventional components. The sensitizing solution is itself disclosed and claimed.

METHOD FOR METALLIZING PLASTICS

In the process of metallizing plastic articles, suitably shaped articles of such plastic are provided with a conductive layer prior to the application of a coating of a final metal layer thereon.

It is generally known in the art to carry out the following steps successively:

1. Pickling of the shaped article, for instance with chromsulfuric acid, in order to obtain a chemical roughening of the surface;
2. Sensitizing, suitably with tin II chloride solutions;
3. Activating with noble metal salts (such as solutions of $PdCl_2$, $AgNO_3$, etc.);
4. Chemically depositing a preliminary layer, for instance of copper or nickel; and
5. Galvanically reinforcing the preliminary metal layer, for instance, with nickel, copper, chromium, silver, gold, or, in a given case, with a mixture of several of these metals.

The present invention relates to this general process, and more particularly refers specifically to an improvement in the sensitizing step (step 2) and to an improved solution for use in such.

Sensitizing solutions for use in metallizing processes of the type described herein are generally produced by dissolving tin II chloride in a dilute hydrochloric acid solution. It is usual to use as sensitizing solutions those in which there are dissolved about 1-40 g. per liter tin II chloride and about 5-100 cm.$^3$ concentrated hydrochloric acid or a corresponding amount of diluted hydrochloric acid per liter water (about 2 to 50 g. hydrogen chloride). However, also other concentrations of the constituents are possible.

For sensitizing modified polyvinyl chloride polymers, solutions are generally used which contain 2-8 g. $SnCl_2$ and 5-20 cm.$^3$ HCl per liter in combination with $PdCl_2$ which provides activation. For acrylonitrile-butadiene-styrene polymer compositions these same solutions can be used, but it is preferred to use solutions containing about 5-15 g. $SnCl_2$ and about 10-50 cm.$^3$ HCl per liter, that is, generally higher proportions of these components.

Insoluble tin compounds precipitate more or less rapidly from such solutions, depending on the concentration of the tin II chloride and the hydrochloric acid, which interfere with the sensitizing action and the subsequent metallization.

The disadvantages of such precipitation of insoluble tin compounds generally cause the galvanic reinforcement which is produced to be a rough, grainy surface. Furthermore, the metallization may be prevented in some areas of the shaped article so that the surface in these areas is not covered with metal. Particularly in the metallization of metallizable polyvinyl chloride polymers, the precipitation of the tin causes a deficiency which will cause the nonuniform deposit of the base layers of nickel. The defective metal layers so produced only possess a low adhesion to the plastic-shaped articles. Since the desired complete protection of the shaped plastic article surface and the decorative effect of the metallization as a smooth, glossy surface is not obtained, such defectively metallized articles are waste.

Though it is impossible to remove the precipitated tin compounds from the sensitizing bath by filtration thereof, an appreciable reduction of the tin ion concentration in the sensitizing solution still rapidly occurs by which the subsequent chemogalvanic metallization is disturbed. Especially, the application of a chemical nickel preliminary layer is considerably disturbed, particularly when it is intended to provide metallizable polyvinyl chloride with a nickel layer.

This invention provides a process for metallizing plastics by the conventional steps of pickling, sensitizing, activation and chemogalvanic precipitation of a metal layer, wherein there is used as sensitizing solution a solution of tin II chloride in diluted hydrochloric acid which additionally contains tin IV chloride.

This invention is of particular value in the metallization of metallizable polyvinyl chloride polymer-shaped articles and in metallizing processes in which a conductive layer of nickel is reductively precipitated from nickel salt solutions onto such articles.

Another aspect of the invention is considered to be the sensitizing solution itself, including tin II chloride dissolved in diluted hydrochloric acid with additions of defined amounts of tin IV chloride.

In accordance with the invention, it is possible to avoid the precipitation of difficulty soluble tin compounds by the use of low concentrations of tin IV chloride calculated on the tin II chloride.

There may be used 0.2 to 35 weight percent, generally 0.5 to 25 weight percent, but preferably 1.0 to 7.0 weight percent of the tin IV chloride, based upon the weight of tin II chloride. It is also possible to use smaller proportions of the tin IV with a measurable effect and improvement being obtained with only 0.1 weight percent Sn IV chloride per Sn II chloride.

With the aid of this material it is possible to maintain the sensitizing solution stable for several weeks and to substantially avoid the precipitation of tin values.

Metallization through the use of sensitizing solutions of this invention results in metallized products without any surface defects, and with excellently smooth and glossy surfaces. The surfaces do not have any rough, grainy or unmetallized areas.

The method of this invention may be used in the metallization of all metallizable plastic-shaped articles. Polymeric articles of particular importance are co- and graft polymers of acrylonitrile, butadiene, styrene, and mixtures of two component copolymers and metallizable homo- and copolymers of vinyl chloride. The copolymers may be with unsaturated comonomers which contain long-chained alkyl radicals or may be with ethylene. Furthermore, polyacetals, polysulfones, polypropylene, chlorinated polyethylene and mixtures thereof with postchlorinated polyvinyl chloride, polyesters, polyamides, etc., are within the scope of polymers from which metallizable-shaped articles for use in this invention can be made.

Particularly suitable metallizable polyvinyl chloride materials, as well as the specifically preferred methods of metallization, are described in greater detail in the Belgian Pat. Nos. 713,290 and 718,487.

EXAMPLE 1 (Comparison example)

Shaped articles of a polymer composed of:
a. 8 weight percent fumaric acid dicetylester and 92 weight percent of vinyl chloride; and
b. 10 weight percent fumaric acid dicetylester and 90 weight percent of vinyl chloride were pickled with chromsulfuric acid (8 g. $CrO_3$ in 60 weight percent $H_2SO_4$). After pickling they were well-washed and then sensitized for 2 minutes in a 2-week-old turbid sensitizing solution of 4 g. tin II chloride, and 10 cm.$^3$ concentrated hydrochloric acid in 1 liter of water.

The product was activated in $PdCl_2$-solution (1 g. palladium chloride and 10 cm.$^3$ concentrated HCl in 1 liter of water) and then the chemical nickel coating was carried out. The thus preliminarily metallized articles showed areas on their surfaces which were not covered with nickel.

Pickled acrylonitrile-butadiene-styrene polymer of the composition 25 weight percent acrylonitrile, 54 weight percent styrene and 21 weight percent butadiene was also nickel metallized as above; however, after galvanic reinforcement of the metal coating there appeared appreciable pitting.

EXAMPLE 2

Identically shaped articles of the polymers set forth in example 1 were pickled with chromsulfuric acid (8 g. $CrO_3$ in 60 weight percent $H_2SO_4$) and then sensitized for 2 minutes in a 2-week-old clean sensitizing solution according to this invention (4 g. $SnCl_2$, 10 cm.$^3$ of concentrated HCl and 0.4 g. $SnCl_4$ in 1 liter of water). After activation in $PdCl_2$ solution (1 g. palladium chloride plus 10 cm.$^3$ of concentrated HCl in 1 liter of water) chemical nickel coating was effected as in example 1.

The metal deposited without defect on the article surface. After completed galvanic reinforcement by nickel and copper, respectively, peel tests, carried out in accordance with DIN 40802, showed an adhesion of 1.8 kp./25 mm.

As in example 1, an identical ABS polymer, of the composition 25 weight percent of acrylonitrile, 54 weight percent of styrene and 21 weight percent of butadiene was metallized in substantially the same manner. Contrary to example 1, the surface was not pitted. Galvanic reinforcement was made with copper or nickel. The peeling test was carried out as above-described with comparable improved results.

EXAMPLE 3

In the same manner as in example 2, there were used sensitizing solutions composed of (contents per liter of water),
a. 0.25 g. $SnCl_4$, 4 g. $SnCl_2$ and 10 cm.$^3$ concentrated HCl
b. 1.0 g. $SnCl_4$, 5 g. $SnCl_2$ and 10 cm.$^3$ concentrated HCl
c. 0.25 g. $SnCl_4$, 2 g. $SnCl_2$ and 5 cm.$^3$ concentrated HCl
d. 0.05 g. $SnCl_4$, 4 g. $SnCl_2$ and 10 cm.$^3$ concentrated HCl
with improved results. Also with these solutions a defect-free metallization was obtained on the plastics set forth in example 2, with a completely smooth, well-adhering metal layer.

EXAMPLE 4

With the aid of the sensitizing solution set forth in example 2, the following polymers were also metallized:
a. 92 weight percent vinyl chloride, 8 weight percent laurylvinylether
b. 88 weight percent vinyl chloride, 12 weight percent 1,2-dicetyl-itaconate
c. 92 weight percent vinyl chloride, 8 weight percent isooctylacrylate
d. 92 weight percent vinyl chloride, 8 weight percent allylstearate
e. A polyamide consisting of phthalic acid and hexamethylene diamine repeating mer units.

There was obtained a defect-free, smooth, closed metal coating layer, as compared with the defective metallized surfaces which result from using similar sensitizing solution but without the tin IV salts.

What is claimed is:
1. In the metallizing of polymeric plastic-shaped articles by the conventional steps of:
A. Pickling;
B. Sensitizing;
C. Activating;
D. Chemical deposition of a preliminary metal layer; and
D. Galvanic metallizing;
the improvement which comprises utilizing as a sensitizing bath a conventional tin II salt containing aqueous bath which additionally contains about 0.1 to 35 weight percent, based on the weight of tin II salt, of at least one tin IV salt.

2. The improved process claimed in claim 1 wherein said tin IV salt is added in a proportion of about 0.5 to 25 weight percent.

3. The improved process claimed in claim 1 wherein said tin IV salt is added in a proportion of about 0.5 to 25 weight percent.

4. The improved process claimed in claim 1 wherein said tin IV salt is added in a proportion of about 1 to 7 percent.

5. The improved process claimed in claim 1 wherein said polymer is selected from the group consisting of vinyl chloride homo- and copolymers, acrylonitrile-butadiene-styrene polymers, polyacetals, polysulfones, polyolefins, chlorinated polyolefins, polyesters and polyamides.

6. In a sensitizing solution for treating metallizable polymeric-shaped articles comprising an acid solution of a tin II salt in water, the improvement which comprises additionally contained about 0.1 to 35 weight percent, based on the weight of said tin II salt of at least tin IV salt.

7. The improved process claimed in claim 6 wherein said tin IV salt is added in a proportion of about 0.2 to 35 weight percent.

8. The improved process claimed in claim 6 wherein said tin IV salt is added in a proportion of about 0.5 to 25 weight percent.

9. The improved process claimed in claim 6 wherein said tin IV salt is added in a proportion of about 1 to 7 percent.

* * * * *